United States Patent
Chen et al.

(10) Patent No.: US 8,873,913 B2
(45) Date of Patent: Oct. 28, 2014

(54) WATER INCURSION RESISTANT CABLE USING SPACED PLUGS

(71) Applicant: Verizon Patent and Licensing Inc., Arlington, VA (US)

(72) Inventors: David Zhi Chen, Richardson, TX (US); George N. Bell, Stormville, NY (US); Patrick B. Anderson, Woodstock, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 95 days.

(21) Appl. No.: 13/631,178

(22) Filed: Sep. 28, 2012

(65) Prior Publication Data

US 2014/0093215 A1    Apr. 3, 2014

(51) Int. Cl.
*G02B 6/44* (2006.01)

(52) U.S. Cl.
USPC ............................ 385/100; 385/109; 385/138

(58) Field of Classification Search
CPC ... G02B 6/4405; G02B 6/4494; G02B 6/4495
USPC .......................................... 385/100, 109, 138
See application file for complete search history.

(56) References Cited

U.S. PATENT DOCUMENTS

| 6,088,499 | A | * | 7/2000 | Newton et al. | 385/112 |
| 6,151,434 | A | * | 11/2000 | Bonicel | 385/102 |
| 6,463,199 | B1 | * | 10/2002 | Quinn et al. | 385/109 |
| 2004/0177915 | A1 | * | 9/2004 | Engel | 156/166 |
| 2006/0004170 | A1 | * | 1/2006 | Sanduja et al. | 528/12 |

* cited by examiner

*Primary Examiner* — Ryan Lepisto

(57) ABSTRACT

A fiber optic cable comprises a jacket defining an outer peripheral surface and a radial thickness terminating at an inner periphery defining a surface, a multiplicity of optical fibers which are enclosed by and extend longitudinally through the jacket within the volume defined by the inner periphery of the jacket, and a plurality of plugs longitudinally spaced within the jacket, where each of the plugs envelops the optical fibers along a fixed longitudinal extent while being closely adjacent he surface defined by the inner periphery of the jacket. The system may further comprise the plugs being of a silicone-based material, and absorbent material disposed within the jacket between the plugs.

22 Claims, 3 Drawing Sheets

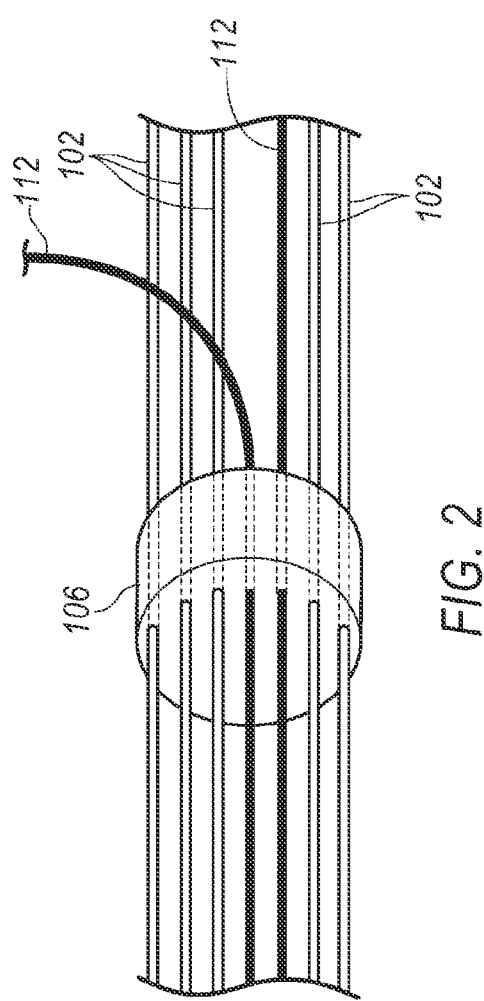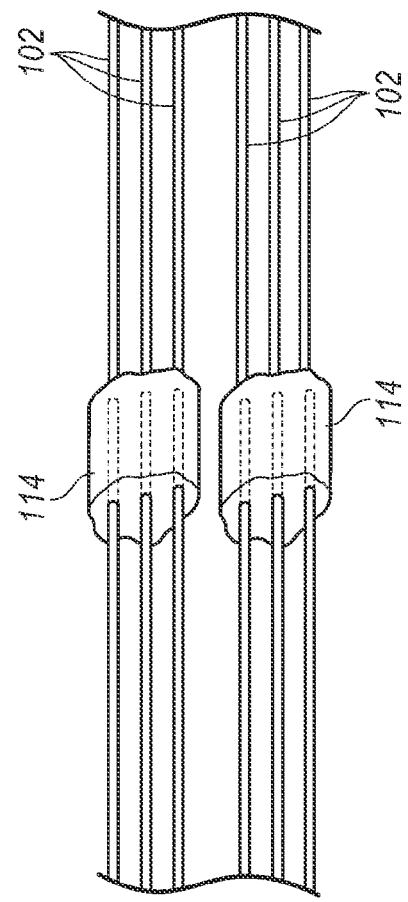

WATER INCURSION RESISTANT CABLE USING SPACED PLUGS

BACKGROUND

Fiber optic cable is often installed for use under harsh environmental conditions. Harsh environmental conditions may include installations in locations where the fiber optic cable is exposed to groundwater. The groundwater may be fresh or salt water, and salt water is known to be particularly debilitating to fiber optic cables. For example, if a fiber optic cable outer casing cracks or otherwise develops a water pathway from an exterior surface to an interior surface surrounding the rest of the cable, water incursion into the interior of the fiber optic cables may damage the interior optical fibers, necessitating repairs. Such damage may take place with water in its liquid form. Moreover, in locations where the fiber optic cable is buried above the frost line, water may penetrate the fiber optic cable and change into a solid state, damaging the fibers as the liquid expands into its solid state. In addition, cables with frozen liquids in them are particularly difficult to repair or service, and may need to be thawed prior to servicing.

To minimize the likelihood of water incursion into a fiber optic cable and subsequent damage to the interior optical fibers, an oil-based gel may be disposed around the optical fibers, both to repel water and to keep the fibers from contacting the water. The oil-based gel typically extends longitudinally through the interior of the fiber cable, coating the length of the fibers. A gel may effectively prevent any liquid from contacting the fibers. However, in order to service or maintain the fiber optic cable, the fibers must first be clean. Oil-based gels are sticky and messy, making it difficult and time-consuming to remove the gel from the fibers.

An alternative method of minimizing the likelihood of water getting into a fiber optic cable is to dispose water absorbent material adjacent the fibers inside the fiber optic cables. However, the absorbent material can only absorb a limited amount of water based on the capacity and amount of absorbent material; and the absorbent material does not stop the water incursion. The fiber optic cable may still eventually fill with water.

Filling a fiber optic cable with a solid material by disposing the material longitudinally along the length of the fibers to prevent liquids from contacting the fibers would result in a cable that is very heavy, stiff and unwieldy, and thus difficult to maintain or service. Depending on the material used, it could also bond the fibers together. As the solid material surrounding the fibers in the section to be serviced would have to be removed in prior to servicing the cable, this would make it difficult to separate the fibers for maintenance.

BRIEF DESCRIPTION OF THE DRAWINGS

FIG. 2 illustrates a pulled ripcord.

FIG. 3 illustrates bits of plug material attached to optical fibers.

DETAILED DESCRIPTION

Figure 1:
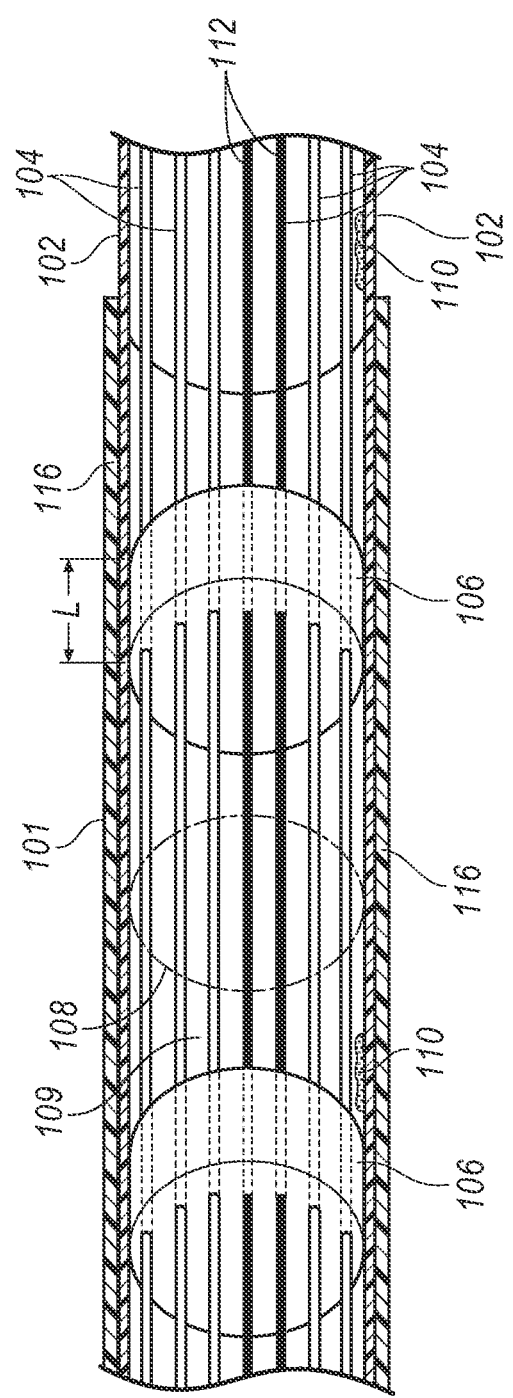
FIG. 1 illustrates an exemplary system for water incursion resistant fiber optic cables using a multiplicity of plugs.

Referring now to the discussion that follows and also to the drawings, illustrative approaches to the disclosed apparatuses and methods are shown in detail. Further, the descriptions set forth herein are not intended to be exhaustive or otherwise limit or restrict the claims to the precise forms and configurations shown in the drawings and disclosed in the following detailed description.

Fiber optic cable often must be installed in environments where it is subject to harsh environmental conditions. A system to reduce water incursion and to quarantine any liquid that does penetrate fiber optic cable is shown and described. By disposing watertight plugs and water absorbent material in the fiber optic cable, the system quarantines and absorbs any liquid that penetrates the fiber optic cable. In contrast to oil-based gels, the plugs may be of a material that is not sticky, messy, or difficult to clean from the fibers, making the cables easier to maintain. Plugs do not add as much weight to the cable as disposing plug material longitudinally along the length of the fibers would. Plugs can form water-tight seals within the fiber optic cable, thus dividing the interior of the cable into sections. Liquids cannot pass beyond the watertight seal formed by a plug from one section of cable to a second section of cable positioned beyond the plug. This minimizes the amount of liquid that can get into the interior of a fiber optic cable, as the interiors of the sections can each hold only a limited amount of liquid. It also quarantines liquid which does penetrate the interior of the fiber optic cable, keeping it in one section of the cable, thereby minimizing the contact between the fibers and the liquid. Such an exemplary cable may present significant cost savings over traditional cables. The cable may be less expensive to produce than traditional cables, and it may be easier to install and handle, thus reducing installation and maintenance costs. It may have better lifetime performance, so it may not need to be replaced as often as traditional cable.

FIG. 1 illustrates an exemplary system for a fiber optic cable 100 that resists water incursion and that quarantines water that penetrates into the fiber optic cable. The fiber optic cable 100 includes a jacket 102 defining an outer peripheral surface 101 and a radial thickness terminating at an inner periphery defining a surface 108. A multiplicity of optical fibers 104 extends longitudinally through the jacket 102 within the volume defined by surface 108. A plurality of plugs 106 are longitudinally spaced within jacket 102 and enveloping the optical fibers along a fixed longitudinal extent while being closely adjacent surface 108 of jacket 102.

The plugs 106 should be of a material that will not degrade in the presence of fresh or salt water, has a long life, and is not an environmental hazard. The plugs 106 may be formed of a material that will, when cured, retain its position and shape, so they will not shift within cable 100, and should have the ability to form a watertight seal. The plugs 106 should be easily removable from optical fibers 104 without the use of special tools or equipment to facilitate maintenance of the cable 100. The plugs 106 should exhibit high thermal stability, as fiber optic cables can be subjected to a wide variation in temperatures. The plugs should also have sufficient flexibility so they won't crack or break when subjected to stresses such as a fiber optic cable would be subjected when being installed or serviced.

Several silicone-based preparations, including many pure silicone and silicone-based caulks, gels, and rubbers may be used as material for the plugs 106. Many silicone-based materials will not degrade in the presence of fresh or salt water, have a long life, and are not environmental hazards. Many silicone-based materials exhibit high thermal stability. After curing, many pure silicone and silicone-based gels, rubbers, and caulks will retain their shape while exhibiting sufficient flexibility to prevent cracking or breaking if subjected to movements that would typically occur during servicing or maintenance of a fiber optic cable. Many silicone-based products can be easily removed from where they have been applied without the use of special tools or equipment. Some examples of appropriate silicone-based products include compounds containing at least ten percent (10%) of at least one of dimethyl siloxane or polydimethylsiloxane.

A fiber optic cable 100 with plugs 106, and especially silicone-based plugs may be easier to maintain than one that is filled with an oil-based gel. For proper termination or maintenance of cables 100, the fibers 104 within the cable, especially the ends of the fibers, have to be clean. The oil-based gels are sticky, and are difficult to remove from the fibers. Wipes saturated with a chemical or alcohol cleaner are a common way to clean the fibers, but this process is time-consuming, made all the more so by the nature of the oil-based gels that are used. The oil-based gels spread to near-by surfaces, including hands or gloves of service technicians, which means that the hand or gloves must also be cleaned.

Each of the plugs 106 should coincide with and adhere to a fixed longitudinal extent of surface 108 of jacket 102, and conform with and adhere to a longitudinal portion of the exterior contours of the fibers 104 where plug 106 envelops the fibers 104 along the fixed longitudinal portion, thus forming a watertight seal among the fibers 104, and between the fibers 104 and the inner surface 108 of the jacket 102. The plugs 106 thereby divide the interior of the fiber optic cable 100 into longitudinal sections 109 that are a series of spaced chambers. Each section has two ends, and is defined by a longitudinal portion of surface 108 and by a plug 106 at each of the ends. Plugs 106, by forming a watertight seal within the interior of the cable 100, can prevent the migration of liquid from one section 109 of cable 100 to an adjacent section 109 of cable 100 on the other side of the plug 106. If water or another liquid does penetrate jacket 102 of cable 100, it will be confined by the plugs 106 at either end of the section 109 of cable, and cannot migrate to adjacent sections 109 of cable. Thus, any damage that may occur from the presence of liquid in cable 100 will be limited to the section 109 in which the breach has developed.

Each of the plugs 106 prevents the migration of liquids beyond plug 106, confining any liquid into a single section 109 of fiber optic cable 100, and each section 109 of cable 100 can hold only a limited amount of liquid as it has a finite volume, determined by the inner surface 108 of the cable and the interval between the plugs 106 at either end of the section. Therefore, plugs 106 disposed in a fiber optic cable 100 don't simply slow the incursion of liquids into the cable 100. By stopping liquids from travelling beyond an isolated section 109 of fiber optic cable 100, plugs 106 may prevent additional incursion of liquids into the fiber optic cable 100 as, once liquid has filled a section 109 of cable 100, no further liquid can enter that section 109 of cable 100. This not only prevents additional liquid incursion into cable 100, but it also prevents liquid from contacting fibers 104 beyond the section 109 of cable 100 that has the breach that is allowing liquid to enter.

Figure 4:
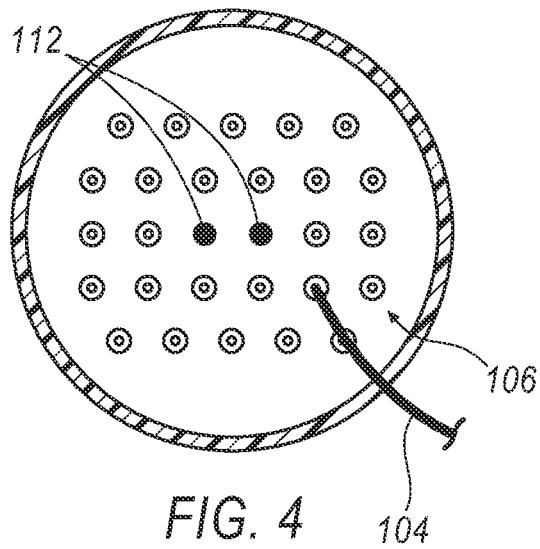
FIG. 4 illustrates a flowchart of an exemplary fiber optic cable using plugs.

The plugs 106 should be easily removable, without the aid of special tools or materials, from the fibers 104 for maintenance on the cable. At least one ripcord 112 enclosed by and extending longitudinally through the jacket within the volume defined by surface 108, wherein a fixed longitudinal portion of the at least one ripcord 112 is enveloped by the plugs 106, may facilitate removal of the plugs 106 for maintenance or servicing of the cable 100. The at least one ripcord 112 may be located among the fibers 104, specifically, in the midst of fibers 104, as shown in FIG. 4. The plugs 106 may form a watertight seal around the at least one ripcord 112. The at least one ripcord 112 may be of a strong yarn that is resistant to breaking and to water damage, such as nylon or a plastic such as polyethylene or polytetraflouroethylene.

Many dried and cured silicone-based products are easy to break apart without the use of special tools and equipment. As shown in FIG. 2, during maintenance or servicing of the fiber optic cable 100, once jacket 102 has been stripped away, one ripcord 112 may be pulled, while a second ripcord 112 may be held stationary. As the first ripcord 112 is pulled and passes through a plug 106, the plug may begin to break apart into pieces 114, as shown in FIG. 3, with some pieces 114 remaining attached to fibers 104. Locating ripcord 112 in the midst of the fibers 104 allows it to break plug 106 from the inside, and also facilitates the separation of fibers 104 one from another. Holding the second ripcord 112 in place may ensure the fibers are not pulled, crushed or otherwise damaged as the first ripcord 112 pulls apart plug 106 and separates fibers 104. Once the first ripcord 112 has been pulled through a plug 106, the plug pieces 114 can then be manually pulled apart, the fibers 104 manually separated from one another, and any bits of plug material quickly and easily removed manually from the fibers 104 without damaging the fibers and without the necessity of using special equipment, cleaning materials or time-consuming methods. Once the pieces 114 of plug 106 have been removed from fibers 104, the fibers 114 may be serviced or maintained.

The fiber optic industry has adopted standard GR-20 (Generic Requirements 20); a standard which is intended to ensure that fiber optic cables installed in exterior applications restrict or prevent the penetration and flow of water or other fluids within the fiber optic cable. A test has been developed for cables that will be buried, either directly or in ducts, in locations where they will be subject to ground water pressure to determine whether fiber optic cables meet the standard. In general, to comply with GR-20, a cable with an opening of a specified size and configuration and subjected to water at 1-meter head pressure for at least 24 hours must prevent water from leaking from the cable. The length of cable tested is generally at least 1 meter in length. The IEC European standard on cable testing uses a similar testing methodology as the GR-20 standard.

Since plugs 106 prevent liquid from migrating, thereby sequestering the liquid within a defined section 109 of fiber optic cable 100, plugs 106 spaced at regular intervals within jacket 102 and at appropriate distances from one another would enable a cable 100 to comply with this illustrative industry standard. In an exemplary approach, the intervals may range from 10 cm to 100 cm; more particularly, the intervals are less than 100 cm, and especially 50 cm or less. Spacing the plugs 106 at intervals of 50 cm or less should ensure that, regardless of where the opening was located in the cable in relation to the plugs, water would not be able to flow through a 100-cm length of cable, and the cable 100 would meet both the GR-20 and the IEC standards.

Smaller intervals between plugs 106 would allow less liquid incursion if a breach did develop in jacket 102, as each section 109 would have less length and, therefore, less volume. However, smaller intervals between plugs 109 would result in more plugs being disposed in a given length of cable 100, which would increase the weight of the cable, making it more difficult to handle during repairs or maintenance. Thus, it is expected that fiber optic cable 100 would be optimized for its particular environment and may be easily customized such as by adjusting the longitudinal placement of plugs 106.

Mainly in response to the difficulties of servicing fiber optic cables that include oil-based gels, many fiber optic cables now contain absorbent material, often in the form of powder, tape or yarn. However, the absorbent material can only absorb a limited amount of liquid. Water or other liquids can continue to penetrate the jacket of a fiber optic cable, and the liquid could spread a significant distance through the cable. The moisture absorbent material does not stop the incursion of liquid into a fiber optic cable, but only absorbs the liquid that does penetrate into the interior of the cable.

In fiber optic cable 100 with plugs 106, absorbent material 110, such as moisture absorbent powder, moisture absorbent yarn, moisture absorbent tape, or a combination of these, may be contained within the jacket. Depending on the form of the absorbent material, an amount of absorbent material may be incorporated between each plug 106. The absorbent material 110 can absorb liquids that get into a section 109 of the jacket 102 that lies between two plugs 106. Thus, the absorbent material can contain some moisture that does penetrate into the interior of the cable 100, yet the liquid cannot travel beyond plugs 106 on either end of the section 109 of cable 100 that the liquid has penetrated. During maintenance or servicing of cable 100, the absorbent material 110 from the jacket 102 will either be contained within the jacket 102 or will fall out and can be brushed away.

The fiber optic cable 100 may have a casing 116 surrounding and adjacent the outer peripheral surface 101 of jacket 102 to provide an extra layer of protection against the elements. The fiber optic cable 100 can also or alternatively have a metal or armor layer (not shown) to protect it from animals or other dangers that might break the fiber optic cable 100.

Figure 5:
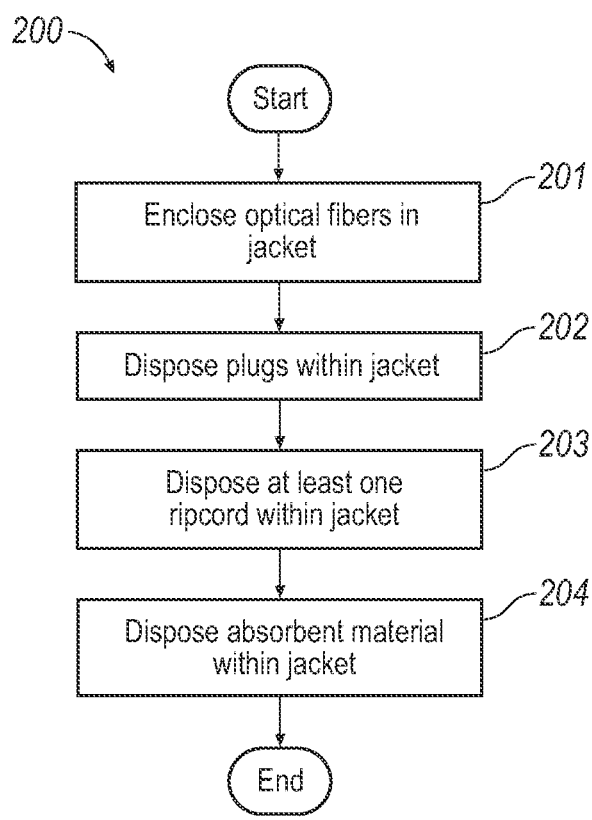
FIG. 5 is a flow chart illustrating an exemplary fiber optic cable using plugs to sequester liquid that penetrates a jacket.

FIG. 5 is a flowchart illustrating an exemplary fiber optic cable 100 using plugs 106 to sequester liquid that penetrates jacket 102. The flowchart starts in block 201 wherein optical fibers 104 are enclosed within jacket 102. As described above, a multiplicity of optical fibers 104 are disposed longitudinally within the jacket 102. Next, in block 202, plugs 106 are disposed within the jacket 102. As illustrated above, disposing the plugs 106 results in the creation of watertight sections 109 within the cable 100. The following step, shown in block 203, is to dispose at least one ripcord 112 within jacket 102, to facilitate the removal of plugs 106 for maintenance. Finally, as shown in block 204, absorbent material is disposed within the jacket to absorb liquid that breaches the jacket 102.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A fiber optic cable comprising:
   a jacket defining an outer peripheral surface and a radial thickness terminating at an inner periphery defining a surface;
   a multiplicity of optical fibers which are enclosed by and extend longitudinally through the jacket within the volume defined by the inner periphery of the jacket;
   a plurality of plugs longitudinally spaced within the jacket; and
   at least one ripcord extending longitudinally through the cable and disposed in the midst of the multiplicity of optical fibers,
   wherein each of the plugs envelops the optical fibers and the at least one ripcord along a fixed longitudinal extent while being closely adjacent the surface defined by the inner periphery of the jacket, and
   wherein each pair of adjacent plugs and the longitudinal section of the inner surface of the jacket which lies between the pair of adjacent plugs defines a chamber.

2. The fiber optic cable of claim 1, wherein a multiplicity of the chambers are watertight.

3. The fiber optic cable of claim 1, wherein the plugs are of a silicone-based material.

4. The fiber optic cable of claim 3, wherein the silicone-based material contains at least ten percent of at least one of dimethyl siloxane or polydimethylsiloxane.

5. The fiber optic cable of claim 3, wherein the silicone-based material is one of a silicone gel, silicone caulk, or silicone rubber.

6. The fiber optic cable of claim 1, wherein the plugs are spaced in the fiber optic cable at regular intervals.

7. The fiber optic cable of claim 6, wherein the plugs are spaced in the fiber optic cable at intervals of less than approximately one meter.

8. The fiber optic cable of claim 6, wherein the plugs are spaced in the fiber optic cable at intervals of no more than approximately 50 cm.

9. The fiber optic cable of claim 6, wherein the plugs are spaced in the fiber optic cable at intervals of greater than approximately 10 cm.

10. The fiber optic cable of claim 1, further comprising absorbent material wherein the absorbent material is disposed within the chamber.

11. The fiber optic cable of claim 1, wherein the at least one ripcord is one of nylon, polyethylene or polytetraflouroethylene.

12. The fiber optic cable of claim 1, further comprising a protective outer jacket, where the protective outer jacket surrounds the jacket.

13. A method comprising:
   enclosing a multiplicity of optical fibers longitudinally in a jacket, the jacket defining an outer peripheral surface and a radial thickness terminating at an inner periphery defining a surface;
   extending at least one ripcord longitudinally in the jacket, the at least one ripcord being disposed in the midst of the multiplicity of optical fibers; and
   disposing a plurality of plugs longitudinally spaced within the jacket, each of the plurality of plugs enveloping the optical fibers along a fixed longitudinal extent while being closely adjacent the surface defined by the inner periphery of the jacket.

14. The method of claim 13, further comprising defining a multiplicity of chambers, wherein each pair of adjacent plugs and the longitudinal section of the inner surface of the jacket which lies between the pair of adjacent plugs is defining the chamber.

15. The method of claim 14, further comprising absorbent material disposed within the chambers.

16. The method of claim 14, wherein the chambers are watertight.

17. The method of claim 13, wherein the plugs are of a silicone-based material.

18. The method of claim 13, wherein the plugs are spaced in the jacket at regular intervals.

19. The method of claim 18, wherein the plugs are spaced in the jacket at intervals of less than approximately 100 cm.

20. The method of claim 18, wherein the plugs are spaced in the jacket at intervals of less than approximately 50 cm.

21. The method of claim 18, wherein the plugs are spaced in the jacket at intervals of more than approximately 10 cm.

22. A fiber optic cable comprising:
   a jacket defining an outer peripheral surface and a radial thickness terminating at an inner periphery defining a surface;
   a multiplicity of optical fibers which are enclosed by and extend longitudinally through the jacket within the volume defined by the inner periphery of the jacket;
   a plurality of plugs longitudinally spaced within the jacket to define a chamber between a pair of adjacent plugs, each of the plugs enveloping the optical fibers along a fixed longitudinal extent while being closely adjacent the surface defined by the inner periphery of the jacket;
   at least one ripcord extending longitudinally through the cable, the at least one ripcord being disposed in the midst of the multiplicity of optical fibers, and a fixed longitudinal extent of the at least one ripcord being enveloped by the plurality of plugs; and
   absorbent material disposed in at least a portion of at least one of the chambers.

* * * * *